(12) United States Patent
Choi

(10) Patent No.: US 8,280,997 B2
(45) Date of Patent: *Oct. 2, 2012

(54) METHOD FOR PERFORMING TRIGGERED SESSION IN TRIGGERED LOCATION SERVICE BASED ON SUPL

(75) Inventor: Jae-Hyuk Choi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 201 days.

This patent is subject to a terminal disclaimer.

(21) Appl. No.: 12/682,871

(22) PCT Filed: Aug. 21, 2008

(86) PCT No.: PCT/KR2008/004870
§ 371 (c)(1),
(2), (4) Date: Apr. 13, 2010

(87) PCT Pub. No.: WO2009/051338
PCT Pub. Date: Apr. 23, 2009

(65) Prior Publication Data
US 2010/0228845 A1 Sep. 9, 2010

Related U.S. Application Data

(60) Provisional application No. 60/980,121, filed on Oct. 15, 2007.

(30) Foreign Application Priority Data

Nov. 28, 2007 (KR) .................. 10-2007-0122309

(51) Int. Cl.
*G06F 15/173* (2006.01)

(52) U.S. Cl. ...... 709/223; 709/203; 709/225; 455/456.1
(58) Field of Classification Search ............... 709/203, 709/204, 223, 225, 230; 455/456.3, 456.1
See application file for complete search history.

(56) References Cited

U.S. PATENT DOCUMENTS

| | | | | |
|---|---|---|---|---|
| 6,654,447 B1* | 11/2003 | Dewan | | 379/76 |
| 7,613,155 B2* | 11/2009 | Shim | | 455/456.1 |
| 7,796,993 B2* | 9/2010 | Kim et al. | | 455/436 |
| 7,853,272 B2* | 12/2010 | Tipnis et al. | | 455/456.3 |
| 7,873,370 B2* | 1/2011 | Shim | | 455/456.1 |
| 2003/0020623 A1* | 1/2003 | Cao et al. | | 340/531 |
| 2006/0184535 A1* | 8/2006 | Kaluskar et al. | | 707/10 |
| 2006/0223490 A1 | 10/2006 | Kim et al. | | |
| 2007/0182547 A1* | 8/2007 | Wachter et al. | | 340/539.13 |
| 2007/0286212 A1* | 12/2007 | Kim et al. | | 370/398 |
| 2008/0109650 A1* | 5/2008 | Shim et al. | | 713/151 |
| 2008/0162633 A1* | 7/2008 | Scherpa et al. | | 709/204 |
| 2008/0189365 A1* | 8/2008 | Narayanaswami et al. | ... | 709/204 |

(Continued)

OTHER PUBLICATIONS

Open Mobile Alliance, Secure User Plane Location Architecture, Approved Version 1.0, OMA-AD-V1_0-20070615-A, Jun. 15, 2007 pp. 1-73.

*Primary Examiner* — Ramy M Osman
(74) *Attorney, Agent, or Firm* — Birch, Stewart, Kolasch & Birch, LLP

(57) ABSTRACT

Disclosed is a triggered session performance in a SUPL-based triggered location service, in particular, a triggered location service capable of pausing an ongoing session and then resuming the paused session by using a dedicated or common message and other certain parameters indicating a session pause/resume.

17 Claims, 5 Drawing Sheets

U.S. PATENT DOCUMENTS

| | | | |
|---|---|---|---|
| 2010/0203902 A1* | 8/2010 | Wachter et al. | 455/456.3 |
| 2010/0228845 A1* | 9/2010 | Choi | 709/223 |
| 2010/0228846 A1* | 9/2010 | Choi | 709/223 |
| 2010/0228847 A1* | 9/2010 | Choi | 709/223 |

* cited by examiner

METHOD FOR PERFORMING TRIGGERED SESSION IN TRIGGERED LOCATION SERVICE BASED ON SUPL

This National Phase Application of PCT/KR2008/004870 claims the benefit of U.S. Provisional Application No. 60/980,121 filed on Oct. 15, 2007 and to Patent Application No. 10-2007-0122309, filed in The Republic of Korea on Nov. 28, 2007. The entire contents of all of the above applications is hereby incorporated by reference.

TECHNICAL FIELD

The present invention relates to a location information system based on Secure User Plane Location (SUPL) architecture, and more particularly, to pause and resume a triggered session in a triggered location service based on a specific SUPL architecture.

BACKGROUND ART

A mobile communication system provides a location service for supplying a location of a terminal to a certain entity periodically or in response to a request, by including a relevant functional part for calculating the location of the terminal in a mobile communication network.

The location service-related network structure varies according to the internal network structure such as 3GPP or 3GPP2. Methods for calculating a current location of a terminal include a cell-ID method for transferring an ID of a cell to which the terminal belongs, a method for measuring the time taken for radio waves of the terminal to reach each base station and calculating the location of the terminal by using trigonometric measurement, and a method using the Global Positioning System (GPS).

In order to provide the location service to a user, considerable signaling and location information should be transferred between the terminal and a location server. The so-called 'positioning technologies' that have been standardized for providing such location services, for instance, a location service based upon the location (position) of a mobile terminal, are undergoing rapid widespread dissemination. The positioning technologies can be provided through a user plane and a control plane. A Secure User Plane Location (SUPL) protocol, which is well-known as an example of the positioning technologies, provides the location service through the user plane.

The SUPL protocol is an efficient method for transferring the location information required for the location calculation of a mobile station. The SUPL protocol employs a user plane data bearer so as to transfer positioning assistance information such as GPS assistance, and to carry positioning technology associated protocols between the mobile terminal and a network.

In general, an SUPL network for providing the location service in a location information system includes an SUPL agent, SUPL Location Platform (SLP), and SUPL Enabled Terminal (SET). The SUPL agent refers to a logical service access point using location information which is actually measured. The SLP refers to a SUPL service access point at a network portion where network resources are accessed to obtain the location information. The SET, being a device capable of communicating with the SUPL network using a SUPL interface, supports procedures defined in the SUPL by interworking with the network through the user plane bearer. Here, the SET may be one of a User Equipment (UE) for UMTS, a Mobile Station (MS) for GSM, a laptop computer having a SET function, a Personal Digital Assistant (PDA) or the like. The SET can be various mobile terminals which are connected through a Wideband LAN (WLAN).

In the location information system, a network for which a user has initially registered is called a home network, and when the user moves or roams to another area, other than the home network area, the network of that other area is called a visited network. An SLP in the home network is called an H-SLP (Home-SLP) while an SLP in the visited network is called a V-SLP (Visited-SLP).

When an SUPL procedure starts in the network of such location information system, an SLP to which an external client is first connected is called a Requesting SLP (R-SLP). The R-SLP is a logical entity, which can be the same as the H-SLP or not. An SET aimed to track its current location is defined by a target SET.

The SLP, as a network element, may include an SUPL Positioning Center (SPC) which is an entity for calculating an actual location, and an SUPL Location Center (SLC) for managing other functions of the SLP excluding the function for calculating location information. Here, the SLC handles roaming, resource managing, and the like.

Therefore, the SET can calculate the location information by communicating with the SPC via the SLC (Proxy mode), or calculate the location information by opening a direct connection with the SPC (Non-proxy mode).

A Triggered Location Service in the SUPL refers to provide location information of a target SET when a specific condition (event) occurs. The triggered location service may include a periodic triggered service which periodically provides location information of a target SET, and an area event triggered service which provides location information of a target SET whenever a specific area occurs.

In the current triggered location service, a triggered session would be ongoing once it has been initiated unless an area event has occurred, a service time has expired, or the triggered session is forcibly terminated. Once the triggered session has been initiated, the session would last for a long period of time. In this instance, a target SET may have a difficulty in maintaining the ongoing triggered session due to a certain condition, or desires to temporarily terminate (end) the ongoing triggered session for its privacy. In such cases, from a perspective of a party which has requested the triggered location service, the ongoing triggered session is unilaterally terminated. The service requesting party should request the triggered location service again to the network (the network performing the triggered location service). This may cause an inconvenience to the requesting party (i.e., user) from the perspective of a service user, and a waste of network resources from the perspective of the network.

DISCLOSURE OF THE INVENTION

Therefore, it is an object of the present invention to pause and resume a triggered session without terminating the triggered session when a terminal desires to pause the triggered session while the triggered session is still ongoing in a triggered location service.

To achieve this object, there is provided a method for performing a triggered session in a triggered location service according to the present invention, in a method for performing a triggered session between a server and a terminal for a SUPL-based triggered location service, including:

(A) pausing, by the terminal, an ongoing triggered session; and (B) resuming, by the terminal, the paused triggered session.

Preferably, the step (A) includes pausing, by the terminal, the triggered session; and sending, by the terminal, a triggered session pause message to the server, and the step (B) includes resuming, by the terminal, the paused triggered session; and sending, by the terminal, a triggered session resume message to the server.

Preferably, the pause message and the resume message are implemented as a SUPL TRIGGERED PAUSE message serving as the same dedicated message, and the SUPL TRIGGERED PAUSE message includes a request-mode parameter.

Preferably, the pause message and the resume message are implemented as a SUPL TRIGGERED STOP message serving as the same common message, and the SUPL TRIGGERED STOP message includes a request-mode parameter.

Preferably, the step (A) includes sending, by the terminal, a triggered session pause request message to the server; pausing, by the server, the triggered session in response to the pause request message; and receiving, by the terminal, a response message notifying the pause of the triggered session from the server.

Preferably, the step (B) further includes sending, by the terminal, a resume request message of the paused trigger session to the server; performing, by the server, the triggered session in response to the resume request message; and receiving, by the terminal, a response message notifying the performance of the triggered session from the server.

To achieve this object, there is provided a terminal according to the present invention including: a transmitter configured to transmit a triggered session pause message or a triggered session resume message; and a SUPL agent configured to generate the message and have a parameter included in the generated message to notify a pause or resumption of the triggered session.

Preferably, the terminal further includes a receiver configured to receive a message notifying a pause or resumption of an ongoing triggered session.

EFFECT

According to the present invention, while a session of a SUPL triggered location service is still ongoing, the session may be paused without being terminated as well as be resumed.

Since the present invention provides a function allowing the target terminal to pause/resume an ongoing SUPL triggered session, there is no need for a service requester to request the SUPL triggered session paused by the target terminal. From the network perspective, there is no need to re-establish a SUPL triggered session by a request from a service requester, thereby preventing resource consumption of the network and unnecessary triggered session request attempt.

MODES FOR CARRYING OUT THE PREFERRED EMBODIMENTS

Figure 1:
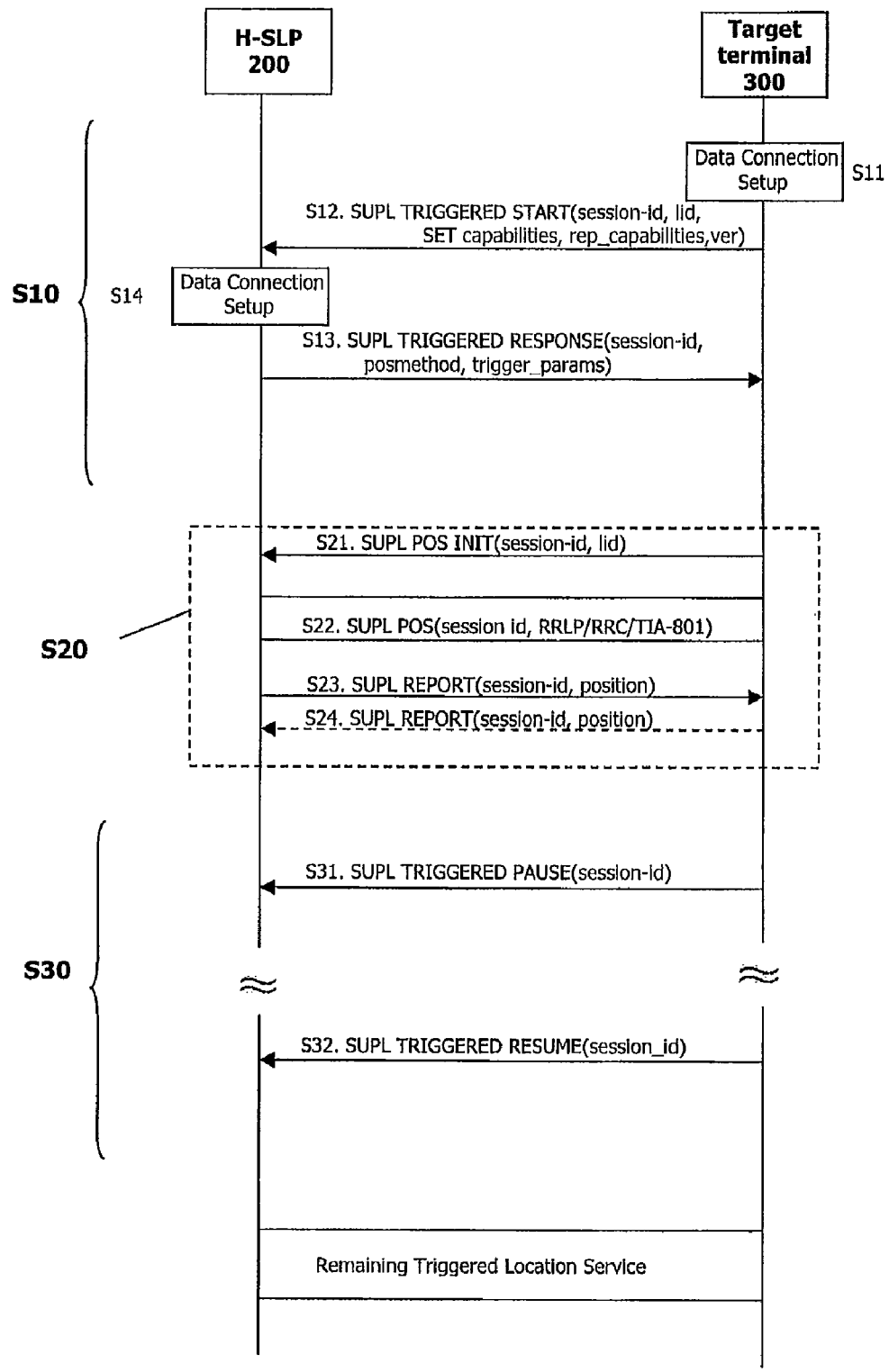
FIG. 1 is a signal flowchart illustrating a procedure of pausing and resuming a session in a triggered location service according to a first embodiment of the present invention.

Descriptions of construction and operation of preferred embodiments of the present invention will be given with reference to the accompanying drawings.

The present invention has recognized that there is no method for pausing a triggered session during the triggered session for a triggered location service in a SUPL-based location information system, and then for resuming the paused session. In recognition of such condition, the present invention is directed to provide a triggered location service capable of pausing an ongoing session and then resuming the paused session by using a dedicated or common message and other certain parameters indicating a session pause/resume.

Exemplary embodiments of the present invention are classified based on a type of messages and parameters, and depending on whether a subject of a session pause/resume is a target terminal or a server (SLP). In particular, the server is the subject of the session pause/resume in second and fifth embodiments of the present invention, and the target terminal is the subject of the session pause/resume in first, third and fourth embodiments of the present invention.

The preferred embodiments of the present invention are based on a SUPL non-roaming service, not a SUPL roaming service. However, this is for brevity in explanation of the present invention, and technical scopes of the present invention would be equally applied to the SUPL roaming service.

The exemplary embodiments of the present invention assume that a SUPL triggered session has already been established by a user requesting a location service of a target terminal. That is, a user's terminal (or a SUPL agent provided in the terminal) requests a triggered location service for a target terminal from a server (H-SLP in the drawing), and a SUPL triggered session for a triggered location service is established between the server and the target terminal. Here, the server refers to a SUPL server of a home network being connected to the user's terminal (or SUPL agent).

Figure 5:
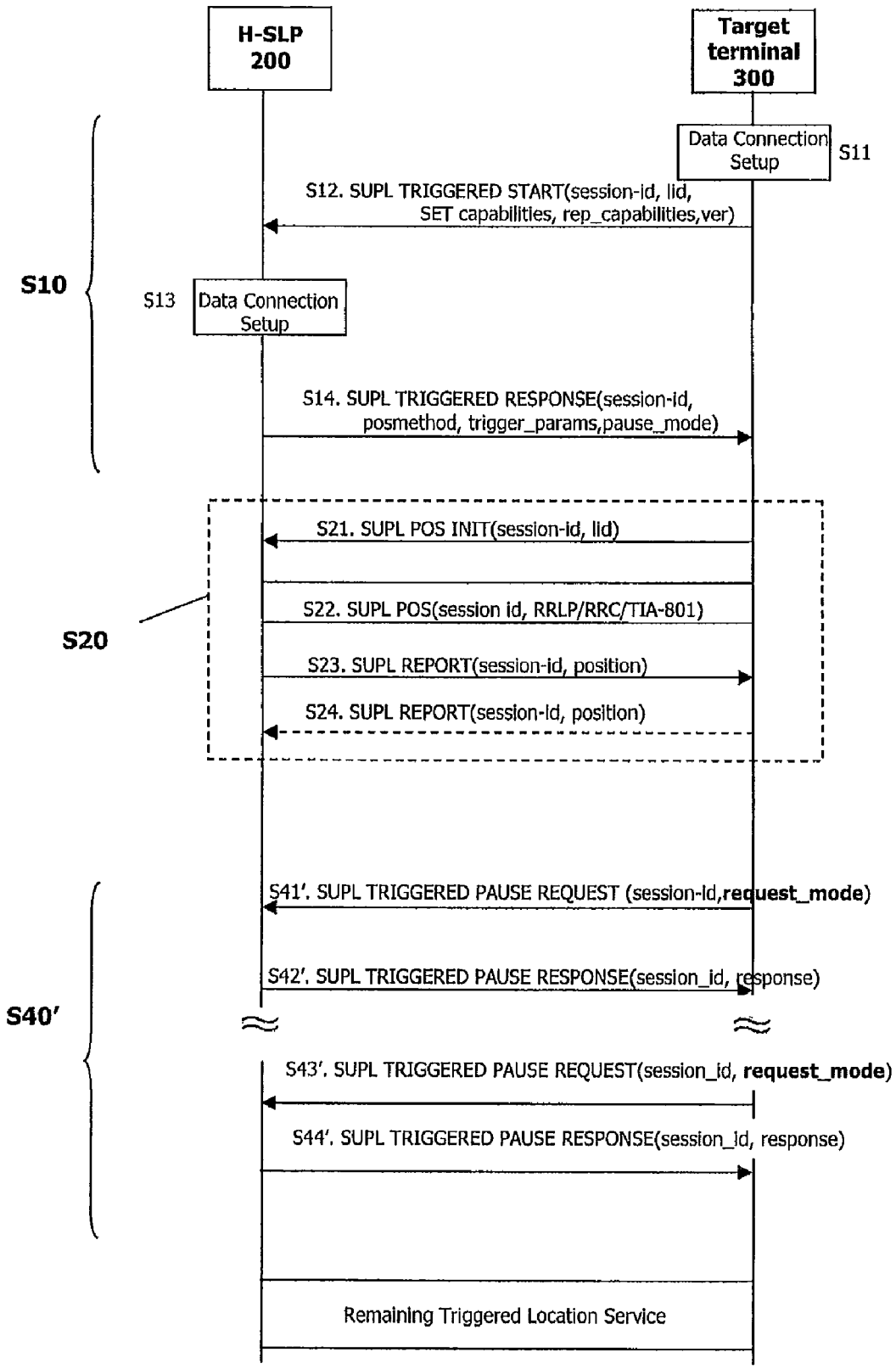
FIG. 5 is a signal flowchart illustrating a procedure of pausing and resuming a session in a triggered location service according to a fifth embodiment of the present invention.

Steps S10 and S20 are all included in a first embodiment in FIG. 1 through a fifth embodiment in FIG. 5 according to the present invention. Hereinafter, descriptions of steps S10 and S20 are given in detail. After receiving a session initiation message (e.g., SUPL INIT message) indicating an initiation of a triggered session from a H-SLP 200, a target terminal 300 is connected to a packet network (S11).

The target terminal 300 sends a message indicating a start of a session for a triggered location service, i.e., SUPL TRIGGERED START message (S12). The SUPL TRIGGERED START message includes parameters, such as a session-id, SET capabilities indicating capabilities of the target terminal 300, and location identifier (lid) indicating a specific cell in a mobile communication network. The SET capabilities include information about positioning methods that can be supported by the target terminal 300 (e.g., SET-Assisted A-GPS or SET Based A-GPS) and associated positioning protocols (e.g., RRLP, RRC, and TIA-801).

Upon receiving the SUPL TRIGGERED START message, H-SLP 200 confirms that the target terminal 300 is not roaming (S13). Based on information included in the received SUPL TRIGGERED START message, the H-SLP 200 selects a positioning method to be used in a SUPL triggered session, and then transmits a SUPL TRIGGERED RESPONSE message to the target terminal 300 (S14). The SUPL TRIGGERED RESPONSE message includes a session-id, a posmethod parameter as well as trigger parameters ('trigger_params' in FIG. 1).

Based on the parameters containing information obtained through the above steps (S11~S16), the target terminal 300 performs a triggered location service in which the target terminal 300 tracks and calculates its position, and then reports the calculated positioning information to the H-SLP 200 (S20). Contents related to step S20 are the same as the Triggered Location Service Feature (Triggered Service: Event Trigger) described in OMA-TS-ULP-V2.0-20070927-D.

Hereinafter, step S20 will be described in more detail.

Periodically (in case of a periodic service) or upon occurrence of a certain event (in case of an event triggered service), the target terminal 300 performs an SUPL POS session by transmitting the SUPL POS INIT message to the H-SLP 200 (S21). Here, a position of the target terminal 300 is tracked and calculated while the target terminal 300 exchanges position procedure messages with the H-SLP until a previously set Quality of Positioning (QoP) is satisfied (S22). It should be noted that in the exemplary embodiment in FIG. 1, the position of the target terminal 300 is calculated by the H-SLP 200. Accordingly, if the positioning of the target terminal 300 is completed, the H-SLP 200 sends a SUPL REPORT message to the target terminal 300 (S23). The SUPL REPORT message includes a session-id and information related to the positioning result. In order to check whether or not the trigger condition is satisfied, the target terminal 300 compares the received location information with the trigger parameter.

The SUPL REPORT message containing the positioning result of the target terminal 300 or the like is transferred to the H-SLP 200 from the target terminal 300 (S24). The SUPL REPORT message in step S24 includes a session-id and position parameter. The position parameter includes information associated with the positioning result. Here, step S24 is performed only when the positioning result of the target terminal 300 is transferred to the user's terminal having requested the triggered location service.

Hereinafter, the preferred embodiments of the present invention including steps S10 and S20 will be described in more detail.

FIG. 1 is a signal flowchart illustrating a procedure of pausing and resuming a session in a triggered location service according to a first embodiment of the present invention. In the first embodiment in FIG. 1, the target terminal is the subject of the session pause/resume, and a dedicated message is used for the session pause/resume.

Descriptions of steps S10 and S20 in FIG. 1 have already been given. Hereinafter, a series of step S30 in FIG. 1 will be described.

While the session between the H-SLP 200 and the target terminal 300 is still ongoing, there would be a case when the target terminal 300 desires to pause the session. In this instance, the target terminal 300 pauses the ongoing session. Then, the target terminal 300 sends a SUPL TRIGGERED PAUSE message to the H-SLP 200 so as to notify that the ongoing session has been paused (S31). The SUPL TRIGGERED PAUSE message includes a session-id parameter. The session-id parameter includes a value capable of identifying the target terminal 300 (i.e., target terminal ID) and a value capable of identifying the H-SLP 200 (i.e., H-SLP ID). When multi sessions between the H-SLP 200 and the target terminal 300 are simultaneously performed, the session-id parameter may function as information capable of distinguishing each session among the multiple sessions.

Under the state that the triggered session has currently been paused through step S31, the target terminal 300 may also resume the paused session. Then, the target terminal 300 sends a SUPL TRIGGERED RESUME message to the H-SLP 200 to notify a resumption of the session paused in step S31 (S32). Here, the SUPL TRIGGERED RESUME message serves as a notification message informing that the target terminal 300 can resume the paused triggered session. In addition, the SUPL TRIGGERED RESUME message includes a session-id parameter, thereby allowing the H-SLP 200 to recognize a session to be resumed between the target terminal 300 and the H-SLP 200.

Figure 2:
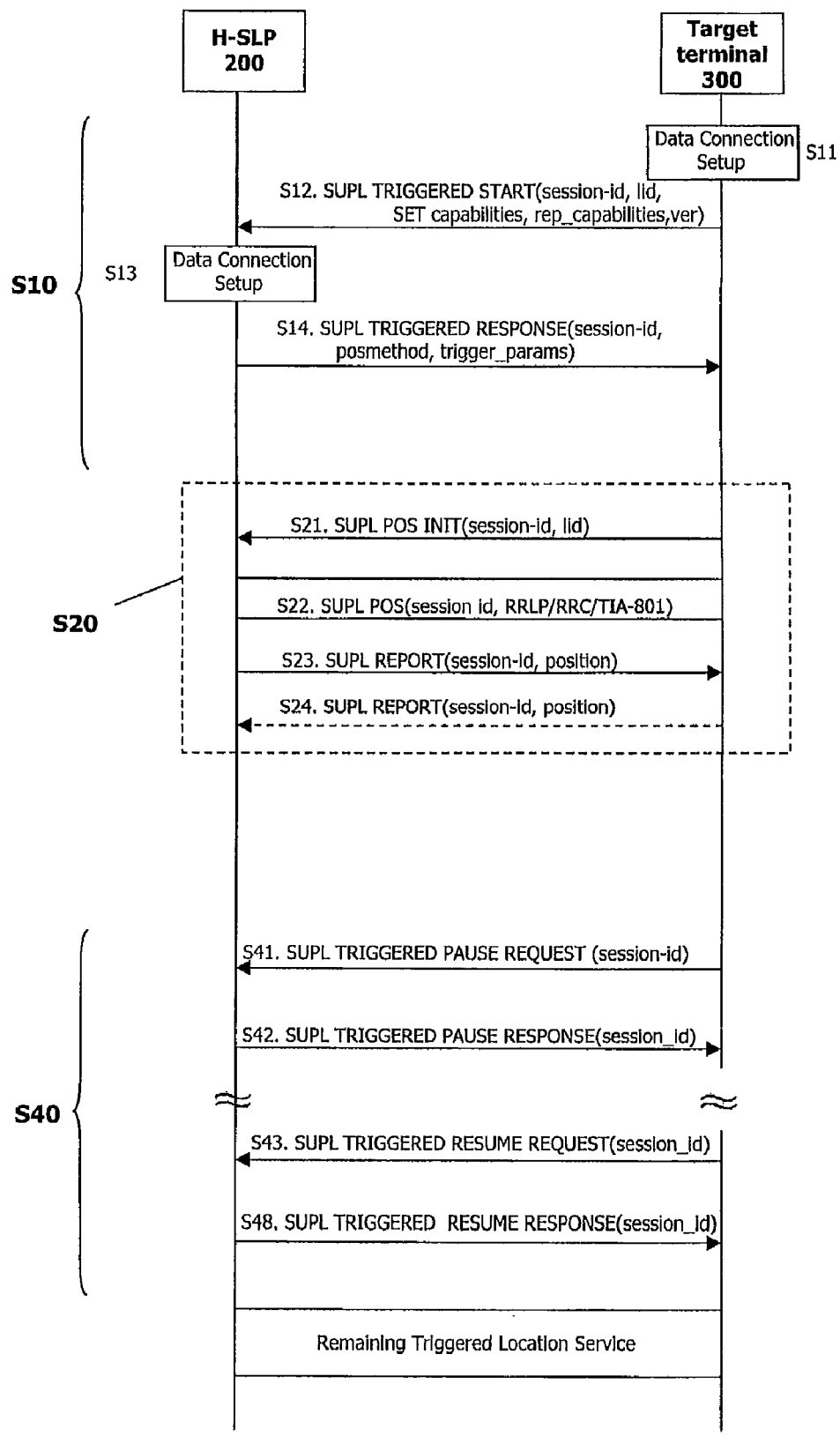
FIG. 2 is a signal flowchart illustrating a procedure of pausing and resuming a session in a triggered location service according to a second embodiment of the present invention.

FIG. 2 is a signal flowchart illustrating a procedure of pausing and resuming a session in a triggered location service according to a second embodiment of the present invention. In the second embodiment in FIG. 2, the H-SLP is the subject of the session pause/resume, and a dedicated message is used for the session pause/resume.

Descriptions of steps S10 and S20 in FIG. 2 have already been given. Hereinafter, a series of step S40 in FIG. 2 will be described.

There may be a case when the target terminal 300 cannot proceed the ongoing triggered session. Here, the target terminal 300 sends to the H-SLP 200 a SUPL TRIGGERED PAUSE message requesting a pause of the ongoing triggered session (S41). Here, the SUPL TRIGGERED PAUSE message includes a session-id parameter indicating a session to be paused.

If the H-SLP 200 determines to accept the request of the session pause, the H-SLP 200 sends a SUPL TRIGGERED PAUSE RESPONSE message to the target terminal 300 (S42). The SUPL TRIGGERED PAUSE RESPONSE message is a message notifying that the request of the session pause by the target terminal 300 has been accepted and thusly the session is paused. The SUPL TRIGGERED PAUSE RESPONSE message includes a session-id parameter indicating the paused session. Meanwhile, if the H-SLP 200 determines not to accept the request of the session pause but to stop (terminate) the session, the SUPL TRIGGERED PAUSE RESPONSE message may include a reason-code indicating the termination of the session.

Currently, the session between the target terminal 300 and the H-SLP 200 has been paused through the SUPL TRIGGERED PAUSE REQUEST message and the SUPL TRIGGERED PAUSE RESPONSE message. Under such condition, if the target terminal 300 desires to resume the session, the target terminal 300 sends a SUPL TRIGGERED RESUME REQUEST message to the H-SLP 200 so as to request the resumption of the paused session (S43). Here, the SUPL TRIGGERED RESUME REQUEST message includes a session-id parameter indicating a session which had been paused and to be resumed. If the H-SLP 200 accepts the request of the session resumption, the H-SLP 200 sends a SUPL TRIGGERED RESUME RESPONSE message to the target terminal 300 so as to notify that the paused session is resumed (S48). Here, the SUPL TRIGGERED RESUME RESPONSE message includes a session-id parameter indicating a session to be resumed. Meanwhile, if the H-SLP 200 determines not to accept the request of the session resumption but to stop (terminate) the session or notifies to resume the session after a certain period of time, the SUPL TRIGGERED PAUSE RESPONSE message may include a reason-code indicating a session termination or a reason-code indicating a session resumption after a certain period of time.

Figure 3:
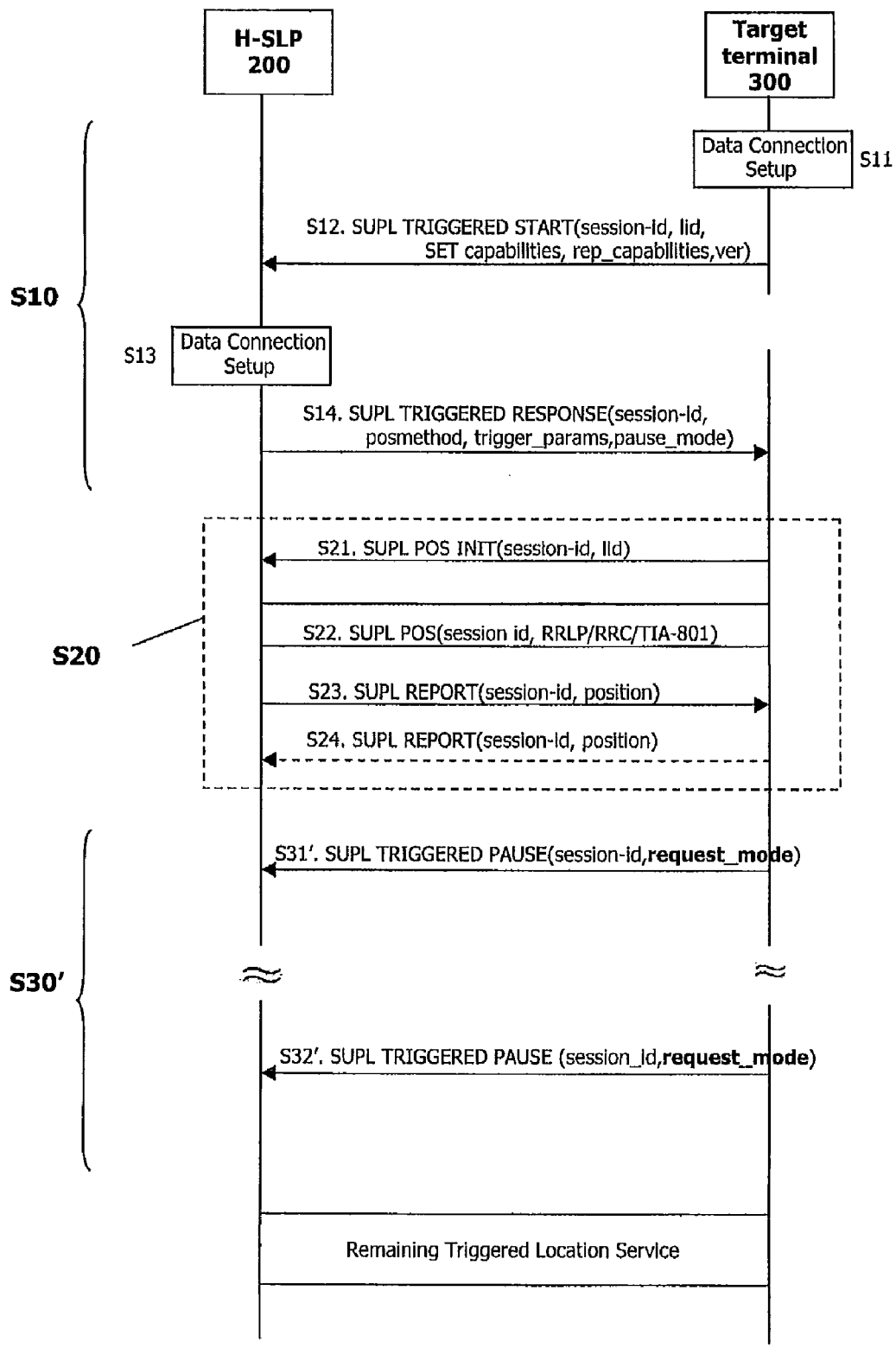
FIG. 3 is a signal flowchart illustrating a procedure of pausing and resuming a session in a triggered location service according to a third embodiment of the present invention.

FIG. 3 is a signal flowchart illustrating a procedure of pausing and resuming a session in a triggered location service according to a third embodiment of the present invention. In the third embodiment in FIG. 3, the target terminal is the subject of the session pause/resume, and the dedicated message is used for the session pause/resume. In addition, the third embodiment in FIG. 3 is similar to the first embodiment in FIG. 1. When compared to the first embodiment in FIG. 1, the first embodiment in FIG. 1 uses two dedicated messages (SUPL TRIGGERED PAUSE message and SUPL TRIGGERED RESUME message) to perform the session pause/resume; however, the third embodiment in FIG. 3 uses one dedicated message (SUPL TRIGGERED PAUSE message). In particular, the SUPL TRIGGERED PAUSE message in a fourth embodiment in FIG. 4 includes a request_mode parameter. According to the parameter value (e.g., request_mode=0 or request_mode=1), the SUPL TRIGGERED PAUSE message may signify either the session pause or session resumption.

Descriptions of steps S10 and S20 in FIG. 3 have already been given. Hereinafter, step S30' in the third embodiment in FIG. 3 will be described.

While the session between the H-SLP 200 and the target terminal 300 is still ongoing, there would be a case when the target terminal 300 desires to pause the session. In this instance, the target terminal 300 pauses the ongoing session. And, the target terminal 300 sends a SUPL TRIGGERED PAUSE message to the H-SLP 200 so as to notify the pause of the ongoing session (S31'). The SUPL TRIGGERED PAUSE message includes a request_mode parameter as well as a session-id parameter. The H-SLP 200 verifies the request_mode parameter value (e.g., request_mode=0) included in the SUPL TRIGGERED PAUSE message, and recognizes that the session has currently been paused.

Under the state that the triggered session has currently been paused in step (S31'), the target terminal 300 may resume the paused session. Then, the target terminal 300 sends the SUPL TRIGGERED PAUSE message (S32'). The SUPL TRIGGERED PAUSE message includes a request_mode parameter indicating that the target terminal 300 has resumed the paused triggered session. The H-SLP 200 checks the request_mode value of the message (e.g., request_mode=1), and recognizes that the paused session is currently resumed. In addition, the SUPL TRIGGERED PAUSE message includes a session-id parameter, thereby allowing the H-SLP 200 to recognize a session to be resumed between the H-SLP 200 and the terminal 300.

When compared to the first embodiment in FIG. 1, the third embodiment in FIG. 3 uses only one message (SUPL TRIGGERED PAUSE message) and one parameter (request_mode) to perform the session pause and resumption. Therefore, the third embodiment in FIG. 3 has an effect of reducing the number of messages used to perform the session pause/resumption.

Figure 4:
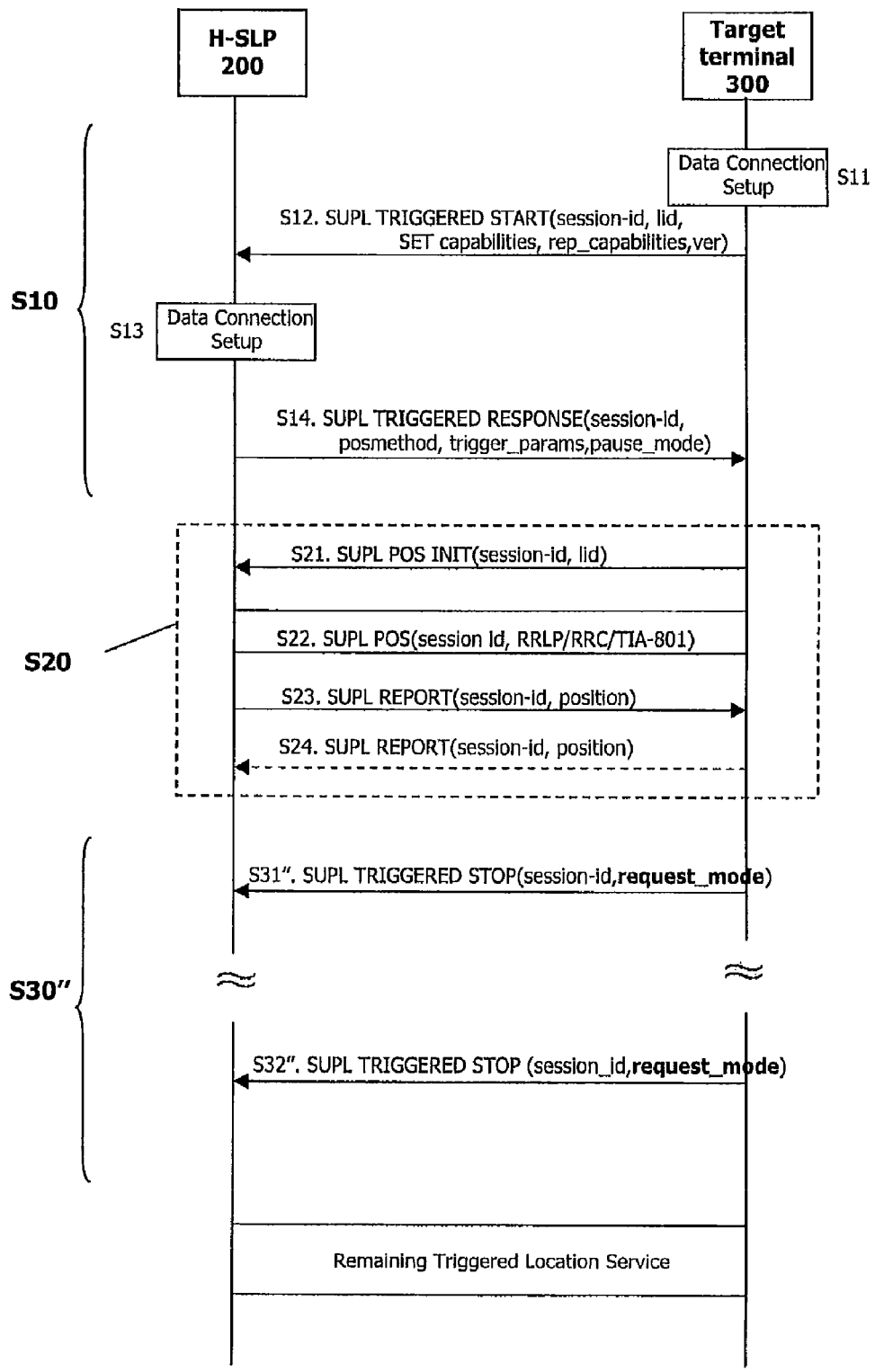
FIG. 4 is a signal flowchart illustrating a procedure of pausing and resuming a session in a triggered location service according to a fourth embodiment of the present invention.

FIG. 4 is a signal flowchart illustrating a procedure of pausing and resuming a session in a triggered location service according to a fourth embodiment of the present invention. In the fourth embodiment in FIG. 4, the target terminal is the subject of the session pause/resume, and a common message is used for the session pause/resume.

The fourth embodiment in FIG. 4 uses a SUPL common message for a session pause/resume, and includes a request_mode parameter in the message so as to discriminate the session pause and resumption based on the parameter value. Here, the common message refers to a general message used to perform the SUPL triggered location service (e.g., SUPL TRIGGERED STOP message: a message used to stop a session), while the dedicated message refers to a message defined for a dedicated usage of the session pause/resumption.

Descriptions of steps S10 and S20 in FIG. 4 have already been given. Hereinafter, step S30" in the fourth embodiment in FIG. 4 will be described.

While the session between the H-SLP 200 and the target terminal 300 is still ongoing, there would be a case when the target terminal 300 desires to pause the session. In this instance, the target terminal 300 sends a SUPL common message (e.g., SUPL TRIGGERED STOP message) including a request_mode parameter to the H-SLP 200 so as to notify the pause of the ongoing session (S31"). The SUPL TRIGGERED STOP message includes a session-id parameter. The H-SLP 200 verifies the request_mode parameter value (e.g., request_mode=1) and recognizes that the session has currently been paused.

Under the state that the triggered session has currently been paused in step (S31"), if the target terminal 300 can resume the paused session, the target terminal 300 sends the SUPL TRIGGERED STOP message (S32"). The SUPL TRIGGERED STOP message includes a request_mode parameter indicating that the target terminal 300 has resumed the paused triggered session. The H-SLP 200 checks the request_mode value of the message (e.g., request_mode=−1), and recognizes that the paused session is currently resumed. In addition, the SUPL TRIGGERED STOP message includes a session-id parameter, thereby allowing the H-SLP 200 to recognize a session to be resumed between the H-SLP 200 and the terminal 300.

Meanwhile, the request_mode parameter value (e.g., request_mode=0) may be used to indicate that the SUPL TRIGGERED STOP message is to stop the SUPL triggered session as originally defined in the message, not to pause/resume the session.

FIG. 5 is a signal flowchart illustrating a procedure of pausing and resuming a session in a triggered location service according to a fifth embodiment of the present invention. In the second embodiment in FIG. 2, the H-SLP is the subject of performing the session pause/resume, and the dedicated message is used for the session pause/resume. The fifth embodiment in FIG. 5 is similar to the second embodiment in FIG. 2. Difference between the fifth embodiment in FIG. 5 and the second embodiment in FIG. 2 is as follows: the second embodiment in FIG. 2 uses 4 different messages for session pause/resume (e.g., SUPL TRIGGERED PAUSE REQUEST/RESPONSE message, SUPL TRIGGERED RESUME REQUEST/RESPONSE message), while the fifth embodiment in FIG. 5 uses only 2 messages (i.e., SUPL TRIGGERED PAUSE REQUEST/RESPONSE message). In addition, the exemplary embodiment in FIG. 5 uses a request_mode parameter, which is used to distinguish the session pause and resumption based on the parameter value. Therefore, as compared to that in FIG. 2, the embodiment in FIG. 5 has an effect of reducing the number of dedicated messages.

Descriptions of steps S10 and S20 in FIG. 5 have already been given. Hereinafter, step S40' in FIG. 5 will be described.

The target terminal 300 sends a message requesting a pause of the ongoing triggered session, i.e., a SUPL TRIGGERED PAUSE REQUEST message, to the H-SLP 200 (S41'). The SUPL TRIGGERED PAUSE REQUEST message includes a request_mode parameter and a session-id parameter. The request_mode parameter is set to a value corresponding to the request of the triggered session pause (e.g., request_mode=0 or request_mode=pause). The session-id parameter includes information indicating a session to be paused. The detailed description of the session-id parameter has already been given.

If the request of the session pause is accepted, the H-SLP 200 sends a SUPL TRIGGERED PAUSE RESPONSE message to the target terminal 300 (S44'). The SUPL TRIGGERED PAUSE RESPONSE message is a message notifying that the request of the session pause by the target terminal 300 has been accepted and thusly the session is paused. The SUPL TRIGGERED PAUSE RESPONSE message includes a session-id parameter indicating the paused session. Additionally, the SUPL TRIGGERED PAUSE RESPONSE message may include a reason-code (e.g., Pause Approval) indicating session pause. Meanwhile, if the H-SLP 200 determines not to accept the request of the session pause, the SUPL TRIGGERED PAUSE RESPONSE message may signify a release of the ongoing session. The SUPL TRIGGERED PAUSE RESPONSE message may further include a reason-code indicating the session release (e.g., Pause Fail).

Through the series of steps (S41'~S42'), the session between the target terminal 300 and the H-SLP 200 is currently paused. Under this condition, if the target terminal 300 is to resume the session, the target terminal 300 sends a SUPL TRIGGERED PAUSE REQUEST message to the H-SLP 200 so as to request the resumption of the paused session (S43'). The SUPL TRIGGERED PAUSE REQUEST message includes a request_mode parameter, which is set to a value requesting the resumption of the paused session (e.g., request_mode=1 or request_mode=resume). The SUPL TRIGGERED PAUSE REQUEST message includes a session-id parameter indicating a session which has been paused and to be resumed.

If the request of the session resumption in step (S43') is accepted, the H-SLP 200 resumes the paused session. Then, the H-SLP 200 sends a SUPL TRIGGERED PAUSE RESPONSE message to the target terminal 300 so as to notify that the paused session is resumed (S44'). Here, the SUPL TRIGGERED PAUSE RESPONSE message includes a session-id parameter indicating a session to be resumed.

Hereinafter, description of the terminal according to the present invention, i.e., the SUPL-enabled terminal (SET), will be given in detail.

The terminal according to the present invention is a terminal capable of performing a SUPL triggered location service, and includes a SUPL agent performing the SUPL service and other basic software and hardware configurations.

The terminal according to the present invention includes a transmitter configured to transmit a triggered session pause message and a triggered session resume message; and a SUPL agent configured to generate the messages and have a parameter included in each generated message to notify a pause of the triggered session or resumption of the paused session. The terminal further includes a receiver configured to receive a message notifying a pause or resumption of an ongoing triggered session.

Meanwhile, the SUPL agent may also be referred to as a controller.

The SUPL agent is configured to pause an ongoing triggered session, and resume the paused session.

The SUPL agent is configured to pause the ongoing triggered session, generate a message notifying that the session has been paused, and transmit the generated message to the server through the transmitter. The SUPL agent is configured to resume the currently paused triggered session, generate a message notifying the resumption of the session, and transmit the generated message to the server through the transmitter.

The SUPL agent is configured to receive a message indicating a pause or resumption of the session from the server, analyze the message, and determine whether or not the ongoing triggered session is paused or resumed.

In addition, each operation of such components in the present invention will be equally applied to corresponding portions explained in FIGS. 1 through 5.

The foregoing embodiments and advantages are merely exemplary and are not to be construed as limiting the present invention. It will also be apparent to those skilled in the art that various modifications and variations can be made in the present invention without departing from the spirit or scope of the invention. Meanwhile, the triggered location service in the series of step (S20) described in all embodiments of the present invention is merely exemplary, and may be modified in various forms. Accordingly, in the exemplary embodiments of the present invention, signal flows corresponding to step (S20) may be applied by being variously modified or changed in signal flows of other location services, and equally applied to the Triggered Location Service Feature (Triggered Service: Event Trigger) described in OMA-TS-ULP-V2.0-20070927-D.

Thus, it is intended that the present invention cover modifications and variations of this invention provided they come within the scope of the appended claims and their equivalents.

The invention claimed is:

1. A method for performing a triggered session in a triggered location service, comprising:
    pausing, using a terminal, an ongoing triggered session with a server for a Secure User Plane Location (SUPL)-based triggered location service; and
    resuming, using the terminal, the paused triggered session,
    wherein the pausing step comprises sending, by the terminal, a triggered session pause message to the server,
    wherein the resuming step comprises sending, by the terminal, a triggered session resume message to the server, and
    wherein the pause message and the resume message are implemented as a dedicated SUPL TRIGGERED message, a common SUPL TRIGGERED message, or the same SUPL dedicated message.

2. The method of claim 1, wherein the pause message and the resume message include a session-id parameter.

3. The method of claim 1, wherein the pause message and the resume message are implemented as a SUPL TRIGGERED PAUSE message serving as the same dedicated message, and the SUPL TRIGGERED PAUSE message includes a request-mode parameter.

4. The method of claim 3, wherein the pause message and the resume message are distinguished by a value of the request-mode parameter.

5. The method of claim 4, wherein the request-mode parameter is set to a value indicating a pause of the triggered session or a value indicating a resumption of the triggered session.

6. The method of claim 1, wherein the pause message and the resume message are the same SUPL common message.

7. The method of claim 6, wherein the pause message and the resume message are implemented as a SUPL TRIGGERED STOP message serving as the same common message, and the SUPL TRIGGERED STOP message includes a request-mode parameter.

8. The method of claim 7, wherein the request-mode parameter includes one of a value indicating a pause of the triggered session, a value indicating a resumption of the triggered session, and a value indicating a stop of the triggered session.

9. The method of claim 1, wherein the pausing step comprises:
sending, by the terminal, a triggered session pause request message to the server;
pausing, by the server, the triggered session in response to the pause request message; and
receiving, by the terminal, a response message notifying the pause of the triggered session from the server.

10. The method of claim 1, wherein the resuming step comprises:
sending, by the terminal, a resume request message of the paused triggered session to the server;
performing, by the server, the triggered session in response to the resume request message; and
receiving, by the terminal, a response message notifying the performance of the triggered session from the server.

11. The method of claim 9, wherein the response message indicating the pause of the triggered session and a response message indicating a resumption of the triggered session are implemented using a SUPL TRIGGERED PAUSE RESPONSE message as the same dedicated message.

12. The method of claim 10, wherein a response message indicating the pause of the triggered session and the response message indicating the performance of the triggered session are implemented using a SUPL TRIGGERED PAUSE RESPONSE message as the same dedicated message.

13. A terminal for controlling a Secure User Plane Location (SUPL)-based triggered location service, comprising:
a transmitter configured to transmit a triggered session pause message or a triggered session resume message to a server; and
a SUPL agent configured to generate the pause or resume message to be transmitted by the transmitter, and have a parameter included in the generated message to notify a pause of the triggered session or a resumption of the paused session,
wherein the pause message and the resume message are implemented as a dedicated SUPL TRIGGERED message, a common SUPL TRIGGERED message, or the same SUPL dedicated message.

14. The terminal of claim 13, further comprising: a receiver configured to receive a message notifying a pause or resumption of an ongoing triggered session.

15. The terminal of claim 13, wherein the SUPL agent is configured to pause an ongoing triggered session, generate a message notifying that the session has been paused, and transmit said generated message through the transmitter.

16. The terminal of claim 13, wherein the SUPL agent is configured to resume a currently paused triggered session, generate a message notifying the resumption of the triggered session, and transmit said generated message through the transmitter.

17. The terminal of claim 13, wherein the SUPL agent is configured to receive a message indicating a pause or resumption of the triggered session, analyze the received message, and determine whether or not the ongoing triggered session has been paused or resumed.

* * * * *